United States Patent [19]

Mackal

[11] Patent Number: 5,058,932
[45] Date of Patent: Oct. 22, 1991

[54] ANNULAR CLIP FOR INFLATION MANIFOLD

[76] Inventor: Glenn H. Mackal, 4923 59th Ave. S., St. Petersburg, Fla. 33715

[21] Appl. No.: 523,156

[22] Filed: May 14, 1990

[51] Int. Cl.⁵ .............................................. F16L 5/00
[52] U.S. Cl. .................................... 285/200; 285/284; 285/305; 285/330; 156/293
[58] Field of Search ............... 285/284, 200, 305, 190, 285/423, 330, 328, 149, 229, 921; 137/223–224, 224.5, 226, 227, 228, 229, 230, 231, 232, 233, 234, 234.5; 156/293

[56] References Cited

U.S. PATENT DOCUMENTS

| | | | |
|---|---|---|---|
| 712,738 | 11/1902 | Stevens | 285/190 |
| 2,273,398 | 2/1942 | Couty et al. | 285/149 |
| 2,779,061 | 1/1957 | Hasking | 285/200 X |
| 3,754,731 | 8/1973 | Mackal et al. | 285/216 X |
| 4,077,456 | 3/1978 | Smith | 137/223 X |
| 4,317,471 | 3/1982 | King | 285/921 X |
| 4,600,221 | 7/1986 | Bimba | 285/319 X |
| 4,812,193 | 3/1989 | Gauron | 156/293 |
| 4,903,997 | 2/1990 | Kifer | 285/284 |

FOREIGN PATENT DOCUMENTS 1964860 7/1970 Fed. Rep. of Germany ...... 285/200
966772 8/1964 United Kingdom ............... 285/921

Primary Examiner—Dave W. Arola
Attorney, Agent, or Firm—Joseph C. Mason, Jr.; Ronald E. Smith

[57] ABSTRACT

An inflation manifold and a clip that snap fittingly engages it so that the manifold and clip assembly resists rotation and retraction relative to an inflatable article when they are molded into a thickened part of the article. The clip is generally annular and in a first embodiment is preferably divided into four independently formed parts that transiently diverge when the base part of the manifold is driven into the clip and which regain their initial position of repose after the base has traveled therepast, capturing said base and preventing its retraction. Both the base and clip are provided with apertures or bores or cutaways that fill with flowable elastomeric material when the inflatable article is molded so that the manifold and clip become an integral part of the inflatable article when the elastomeric material hardens. In a second embodiment, the clip is integrally formed and is molded into capturing relation to the base. In both embodiments, a cutaway is formed in the base so that hard or soft plastic fills the cutaway and further locks the manifold against rotation, the former being employed when increased rotation resistance is desired.

9 Claims, 2 Drawing Sheets

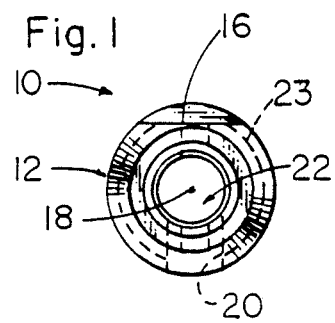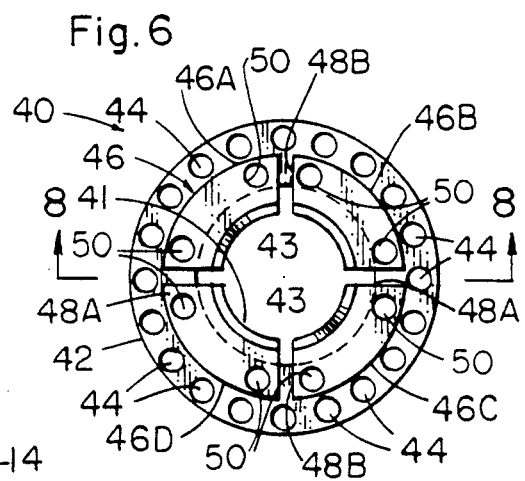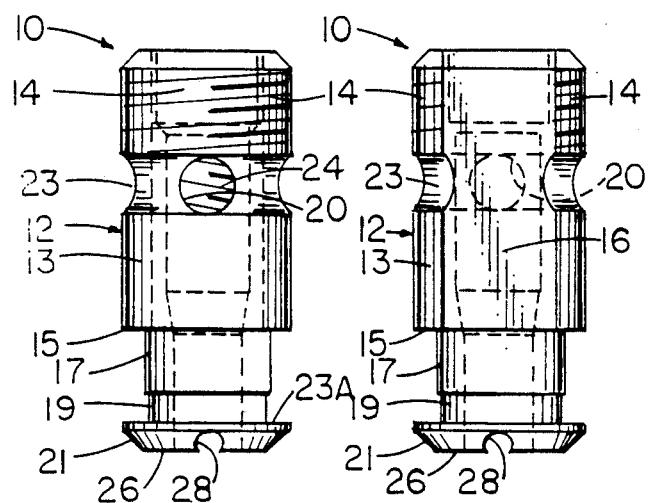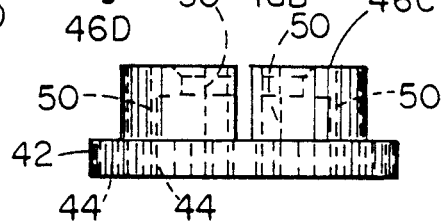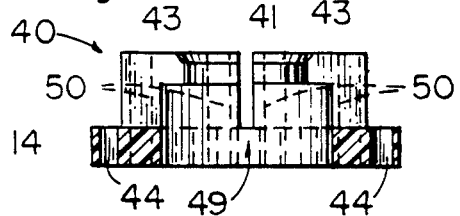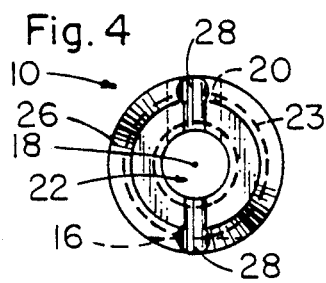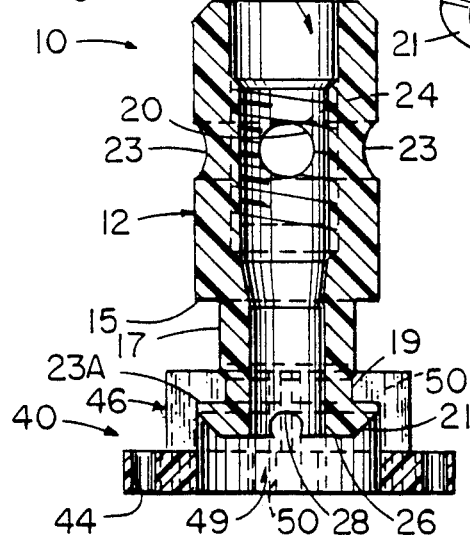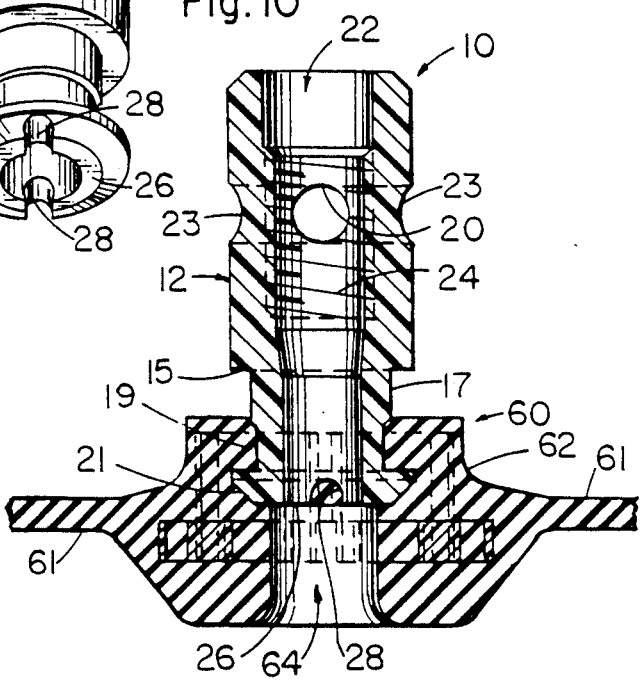

Chemical# 5,058,932

ANNULAR CLIP FOR INFLATION MANIFOLD

TECHNICAL FIELD

This invention relates, generally, to manifolds of the type found in inflatable articles. It relates, more precisely, to a resilient clip that snaps onto or which is molded onto such a manifold and which is specifically adapted to hold the manifold against rotation and retraction relative to an inflatable article.

BACKGROUND ART

Mackal et. al. U.S. Pat. No. 3,754,731 shows an inflation manifold and flange assembly that resists rotation of the manifold when it is subjected to torque. The manifold shown therein is of metallic construction and a part thereof is mechanically connected and sealed to the top half of a plastic crimp flange which in turn is heat sealed to an elastomeric panel of the inflatable article. The proximal end of the manifold body is then bent, with a tool, radially outwardly into plural prongs having sharp points that engage the elastomeric material positioned between the top half of the crimp flange and the bottom half thereof, which includes said prongs. In this manner, the elastomeric material is held in sandwiched relation between said top and bottom halves of the crimp flange and facile rotation of the manifold is thereby defeated.

One drawback of this early manifold is the need to bend its proximal end with a tool. The prong-forming process produces small flakes or particles of metal that interfere with the RF welding used in the manufacturing process. Specifically, the metal fragments are electrically conductive and holes are burned in the plastic by the heat generated by current flow through the fragments. Moreover, repeated applications of torque eventually causes the prongs to lose their grip on the elastomeric material. The hard plastic gripped by the prongs also becomes brittle and hence easily breakable with age. Thus, the use of prongs is ultimately unsatisfactory.

Accordingly, there is a need for an inflation manifold construction that does not require the use of metallic prongs or of a bending tool for forming said prongs. There is also a need for a manifold construction that cannot be defeated even by virtually unlimited applications of torque thereto, but the prior art, taken as a whole, neither teaches nor suggests how these needs could be fulfilled.

DISCLOSURE OF INVENTION

The longstanding but heretofore unfulfilled need for an improved rotation and retraction-resistant inflation manifold is now fulfilled by a manifold having a mounting flange that is snapped fittingly engaged thereto, or, in a second embodiment, molded thereto.

The mounting flange or clip has a flat annular base and a main body part that extends longitudinally therefrom. The main body part terminates in a radially inwardly extending flange that retains the disc-shaped head of the inflation manifold against retraction from the inflatable article. To admit the head or base of the manifold into its retention area, the main body part, in a first embodiment, is subdivided into four or other suitable plurality of resilient equal-sized quadrants that are transiently spread apart from one another when the manifold base is driven thereagainst and which spring back into their equilibrium position after the manifold base is captured therebehind. In a second embodiment, the mounting clip is molded around the base of the manifold, thereby eliminating the need to subdivide the main body part thereof.

The annular base of the clip, the main body of the clip and the manifold base captured thereby are all suitably apertured or otherwise contoured or cut away in both embodiments so that when elastomeric material is poured therearound to make an inflatable article such as a life vest, said material enters into the openings or cutaways and solidifies, making said clip and manifold base an integral part of the elastomeric material from which the inflatable article is made.

An important object of this invention is to advance the art of rotation and retraction-resistance inflation manifolds of the type found in inflatable elastomeric articles.

A more specific object is to provide a mounting flange that snap fittingly engages a manifold head.

Another specific object is to provide a mounting flange that is molded about a manifold base.

Still another object is to provide a manifold and clip therefor that are apertured so that they become an integral part of the inflatable article when the article is manufactured.

These and other objects and advantages of this invention will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 1 is an end elevational view of the novel inflation manifold;

FIG. 2 is a side elevational view thereof;

FIG. 3 is a side elevational view thereof that is diametrically opposed to the view of FIG. 2;

FIG. 4 is a second end view of the inflation manifold;

FIG. 5 is a perspective view thereof;

FIG. 6 is an end view of a first embodiment of the novel manifold retainer or clip used in conjunction with the inflation manifold;

FIG. 7 is side elevational view of the clip shown in FIG. 6;

FIG. 8 is a sectional view taken along line 8—8 in FIG. 6;

FIG. 9 is a longitudinal cross section of the assembled manifold and clip prior to said manifold and clip being molded into the pliable material of the inflatable article;

FIG. 10 is a longitudinal cross sectional view similar to FIG. 9, but showing the parts molded into the pliable material of the inflatable article;

Similar reference numerals refer to similar parts throughout the several views of the drawings.

BEST MODES FOR CARRYING OUT THE INVENTION

Figure 11:
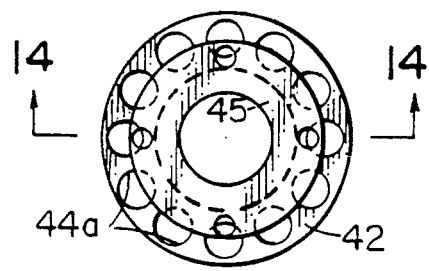
FIG. 11 is a first end view of a second embodiment of the manifold retainer.

Referring first to FIGS. 1-5, it will there be seen that the inflation manifold, without the novel flange, is denoted 10 as a whole.

Manifold 10 has a preferably metallic, generally tubular main body 12 having external threads 14 formed on the distal free end thereof as best shown in FIGS. 2, 3 and 5. Flat 16, best shown in FIGS. 1 and 3, interrupts the threads without affecting their function.

A radially extending aperture 20 is formed in the main body 12 in diametric opposition to flat 16; the radially innermost end of aperture 20 is in open fluid communication with central passageway 22 which is centered around the longitudinal axis of symmetry 18 of main body 12. Transverse band or groove 23 circumscribes main body 12 in registration with aperture 20 so that gaseous fluid is channeled into said aperture 20 even if aperture 20 is not in exact diametric opposition to flat 16. It should also be understood that groove 23 could have a greater longitudinal extent than that depicted so that gaseous fluid would also be channeled into aperture 20 if manifold 10 were axially or longitudinally displaced from its intended position relative to the inflator (not shown). Moreover, groove 23 need only intersect aperture 20, i.e., the total registration therewith as depicted is neither critical nor required.

Internal screw threads 24 are formed in the cylindrical side walls of central passageway 22 as shown in FIG. 2 (and FIGS. 9 and 10); those screw threads engage complementally threaded parts not germane to the present invention.

Referring again to the exterior surface of main body 12, it should be observed that the balance of manifold 10 includes cylindrical side walls 13, annular shoulder 15 that lies in a plane transverse to axis of symmetry 18, another longitudinally extending cylindrical part 17 having a reduced diameter in relation to cylindrical part 13, another annular shoulder, of nominal radial extent, and longitudinally extending cylindrical part 19 having a diameter slightly less than that of part 17, all as perhaps best understood in connection with FIGS. 2, 3 and 5. The longitudinal extent of cylindrical part 19 is specifically preselected to match the thickness of the part of the retainer clip that engages it, as will become clear as this description proceeds.

Disc-shaped base 21 of main body 12 is of generally frusto-conical configuration as shown and its flat trailing end is denoted 26. A diametrically extending bore or valley 28, transverse to axis of symmetry 18, is formed in base 21 as shown, i.e., the bore is formed in open communication with flat trailing wall 26 so that it forms a horseshoe-shaped groove or valley as depicted. Valley 28 is depicted extending diametrically relative to base 21, but it could be offset from the diameter of said base, at least to some extent, without destroying its anti-rotation function. In another embodiment, not shown, valley 28 is obviated and an "L"-shaped ledge is formed on the edge of base 21. In effect, valley 28 is squared off and shifted from its diametric position to said edge; it still provides the desired anti-rotation means and is easier to manufacture.

Having completed a general disclosure of manifold 10, reference is now made to FIGS. 6-8 where a first embodiment of the novel mounting clip 40 is shown.

Clip 40, which is made of a high impact plastic, includes a disc-shaped base 42 having a plurality of equidistantly and circumferentially spaced apertures 44 formed therein about the periphery thereof.

Cylindrical part 46 extends longitudinally from base 42 and in a first embodiment is preferably quartered, i.e., cut into four equal-sized arcuate quadrants or segments 46A, 46B, 46C and 46D by radially extending intersecting cuts 48A, 48B. Port 46 could also be cut into a different number of parts, and said parts need not have a common size. Each quadrant has a radially-inwardly extending distal end or flange 45 as can be seen in the drawings. A pair of circumferentially spaced, longitudinally extending bores, collectively denoted 50, are formed in each quadrant 46A-46D, at opposite ends thereof as depicted. The flat planar faces 47A, 47B of quadrants 46A, 46B are pointed out in FIGS. 6 and 8, as is main central passageway 49 (FIG. 8), reduced diameter central passageway 41, and the chamfers 43 formed in quadrants 46A, B, C and D.

A longitudinal sectional view of the assembled manifold 10 and clip 40 is provided in FIG. 9. It should be understood that in this first embodiment, clip 40 is slidably inserted onto frusto-conical base 21. It is important to observe that the assembly process is begun by positioning the annular beveled edge of frusto-conical base 21 into abutting engagement with the chamfers 43 formed in quadrants 46A-D. Clip 40 and main body 12 are then displaced toward one another along their common longitudinal axis of symmetry; that relative motion will cause resilient quadrant members 46A-D to diverge radially outwardly until the frusto-conical base 21 has entered into the position depicted in FIG. 9, at which time the quadrants resume their respective positions of repose as shown in FIG. 9, i.e., the quadrants 46A-D snap back into their position of FIGS. 6-8 as soon as base 21 has fully entered into central passageway 49 of clip 40 and the annular leading edge 23 of base 21 abuttingly engages the radially inwardly extending flanges of said quarters 46A-D.

Once manifold 10 and clip 40 are so assembled, a plug, not shown, is removably inserted into central passageway 49 and an elastomeric material 60, shown in FIG. 10, is injected or formed around the proximal end of the assembly as depicted, i.e., main body 12 is largely uncovered. The elastomeric material forms a thin panel 61 from which an inflatable object is formed and said material is thickened in the region of the clip 40 to completely cover the same.

The flowable elastomeric material enters into all of the bores 44 formed in base 42 of clip 40, and into all of the bores 50 formed in the quadrants 46A-D. Moreover, the flowable natural or synthetic material 60 also flows into the intersecting cuts 48A, 48B that quarter part 46, so that when said material hardens in bores 44, 50 and said cuts, clip 40 cannot rotate with respect to said material 60, i.e., the clip, in effect, becomes an integral part of the final inflatable article.

The flowable material 60 may also enter the horseshoe-shaped groove 28 formed in base 21 of main body 12 to further enhance the anti-rotational properties thereof or into the aforementioned "L"-shaped variation thereof. However, the introduction of hard plastic as distinguished from pliable, elastomeric plastic, into groove 28 or its "L"-shaped equivalent serves to enhance the anti-rotational properties of main body 12 to an even greater degree.

The plug, above-mentioned, is removed after the material 60 has hardened, leaving opening 64 where said plug had been so that central passageway 49 of clip 40 and central passageway 22 of main body 12 are confluent with the air inside the inflatable article.

When an externally threaded device is screw threadedly engaged to internal threads 24 of main body 12, the hardened elastomeric material 60 or the still harder non-elastomeric plastic that occupies groove or cutaway 28 in frusto-conical base 21 will hold said main body 12 against rotation and the material 60 that embeds both base 21 and clip 40 performs the same function. Perhaps just as importantly, the radially-inwardly extending parts of the quadrants 46A-D prevent retraction of main body 12 from material 60 as is perhaps best understood in connection with FIGS. 9 and 10.

Figure 12:
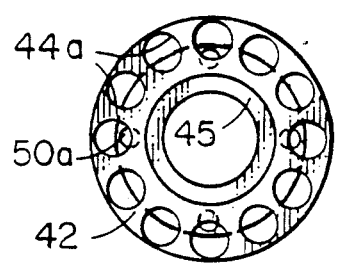
FIG. 12 is a second end view of the retainer shown in FIG. 11.
Figure 13:
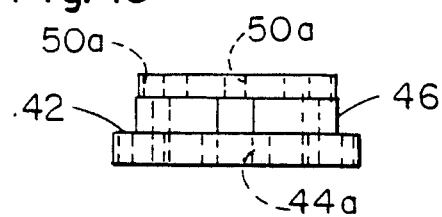
FIG. 13 is a side elevational view of the retainer.
Figure 14:
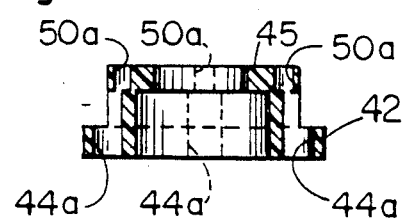
FIG. 14 is a sectional view taken along line 14—14 in FIG. 11.
Figure 15:
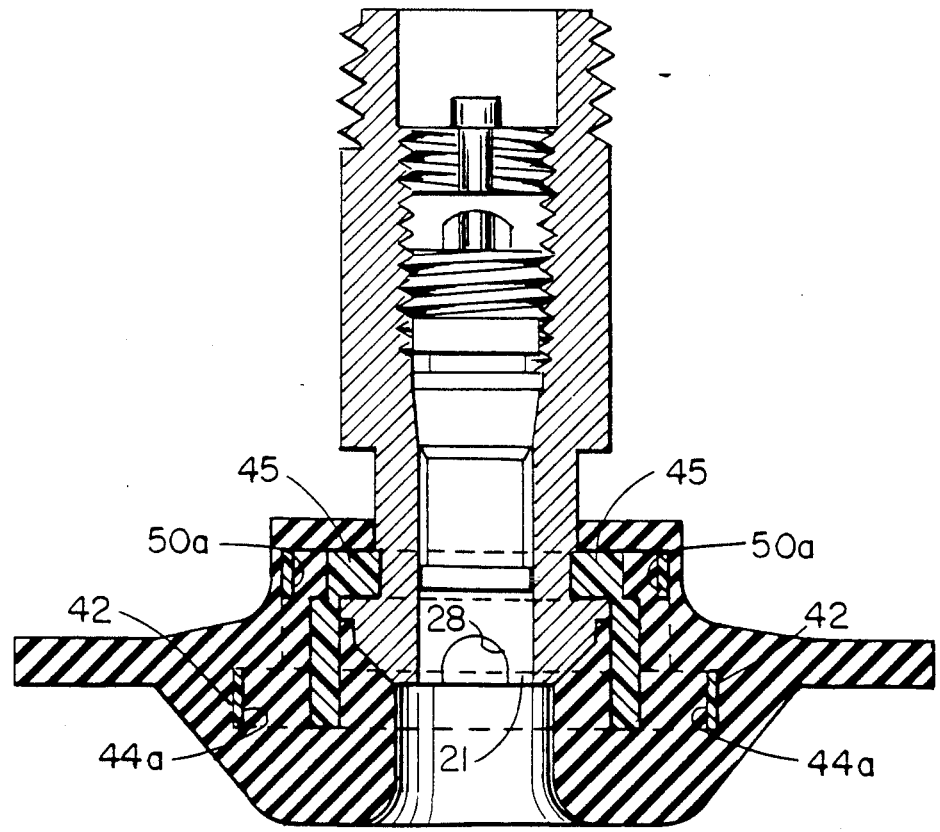
FIG. 15 is a longitudinal sectional view showing the parts of the second embodiment molded into the pliable material of the inflatable article.

In a second embodiment, shown in FIGS. 11-15, cylindrical part 46 is not quartered or otherwise split and thus there are no individual parts 46 A-D thereof. Part 46, in this second embodiment, continues to include the radially inwardly directed annular flange 45, however. Base 21 of main body 12 is captured therebehind, as in the first embodiment, by molding part 46 around said base 21 as perhaps best understood in connection with FIG. 15.

A first plurality of bore members, collectively denoted 44a, are formed in base 42 of this embodiment. Bores 44a have a larger diameter than bores 44 of the first embodiment; accordingly, they overlap with a second plurality of bore members, collectively denoted 50a, formed in part 46 as shown. It should be noted that in the first embodiment, bores 44 and 50 did not overlap, as shown in FIG. 6. Due to the overlap provided in this second embodiment, the flowable material 60 forms a dogleg as it fills the misaligned bores 44a, 50a. Thus, the bores interlock with one another, i.e., the flowable material disposed in the first and second plurality of bores forms an integral mass, thereby further enhancing the structural integrity of the assembled structure as is apparent from FIG. 15. As in the first embodiment, groove or "L"-shaped cutaway 28 in head 21 may receive either soft or hard plastic, depending upon several factors such as initial design considerations, material selections, and the amount of rotational resistance desired.

This invention is clearly new and useful. Moreover, it was not obvious to those of ordinary skill in the art at the time it was made, in view of the prior art, considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. An inflation manifold and a retaining clip attachable thereto, comprising:

a generally tubular manifold main body having a distal free end, a proximal end, and a longitudinal axis of symmetry;

a generally disc-shaped, frusto-conical in configuration base member integral to said manifold main body at the proximal end thereof;

said frusto-conical configuration providing an annular beveled surface on a proximal side of said base member;

a clip member having a flat, annular base part at its proximal end, having a first predetermined diameter, and an integral longitudinally extending cylindrical part at its distal end, having a second diameter less than said first diameter, and said second diameter being uniform along it extent;

a radially inwardly extending flange being formed on a distal end of said cylindrical part;

said cylindrical part being divided into a plurality of separately formed, circumferentially extending segments, said segments being formed of a resilient material;

said annular beveled surface of said base member transiently displacing each of said segments in a radially outward direction, relative to said axis of symmetry, when said base member and segments are axially aligned with respect to one another and displaced toward one another, said segments resuming their equilibrium position upon said base member passing beyond said inwardly extending flanges thereof, thereby capturing said base member therebehind and preventing axial retraction of said manifold main body therefrom;

a plurality of apertures formed about a peripheral edge of said flat, annular base part of said clip member; and at least one longitudinally extending bore formed in each of said segments, each of said at least one bores being formed radially outwardly of said radially inwardly extending flanges.

2. The manifold and clip of claim 1, wherein said manifold main body further includes a first tubular extension of reduced diameter relative to said main body, said first extension being integral to, coaxial with and extending longitudinally in a proximal direction from said main body, a second tubular extension of slightly reduced diameter relative to said first extension, said second tubular extension being coaxial with and extending longitudinally from, in a proximal direction, said first tubular extension, and said base member being integral to said second tubular extension.

3. The manifold and clip of claim 2, further comprising an annular chamfered surface formed on radially innermost ends of said radially inwardly extending flange of each of said segments, said chamfered surface abuttingly engaged by said annular beveled surface of said base member when said base member and clip member are driven toward one another to assemble said manifold and clip.

4. The manifold and clip of claim 3, further comprising at least one cutaway means formed in said base member.

5. The manifold and clip of claim 4, wherein said at least one cutaway means extends diametrically relative to said base member.

6. The manifold and clip of claim 5, wherein said longitudinal extent of said second tubular extension is just slightly greater than the predetermined thickness of said flange.

7. An inflation manifold and a retaining clip, comprising:
- a generally tubular manifold main body having a distal free end, a proximal end, and a longitudinal axis of symmetry;
- a generally disc-shaped base member integral to said manifold main body at the proximal end thereof;
- a clip member having a flat, annular base part at its proximal end, having a first predetermined diameter, and an integral longitudinally extending cylindrical part at its distal end, said cylindrical part having a second diameter less than said first diameter;
- a radially inwardly extending flange being formed on a distal end of said cylindrical part having a diameter less than the diameter of said base member;
- said base member being positioned on the proximal end of said flange and being retained therebehind against travel in a proximal-to-distal direction; and
- said clip member and said base member being joined to one another by molding materials;
- a first plurality of longitudinally aligned bore members formed in the base part of said clip member, said first plurality of bore members being spaced about said base part and each of said first plurality of bore members having a first predetermined diameter;
- a second plurality of longitudinally aligned bore members formed in the cylindrical part of said clip member, said second plurality of bore members being spaced about said cylindrical part, each of said second plurality of bore members having a second predetermined diameter less than said first predetermined diameter, said first and second plurality of bore members being disposed in overlapping relation to one another, flowable material disposed in said first and second plurality of bore members forming an integral mass to enhance the structural integrity of the manifold and clip.

8. The manifold and clip of claim 7, further comprising a cutaway means formed in said base member.

9. The manifold and clip of claim 8, wherein said cutaway means extends coincident with a diameter of said base member.

* * * * *